(12) United States Patent
Liu et al.

(10) Patent No.: US 10,003,544 B2
(45) Date of Patent: Jun. 19, 2018

(54) METHOD AND APPARATUS FOR PRIORITY FLOW AND CONGESTION CONTROL IN ETHERNET NETWORK

(71) Applicant: Futurewei Technologies, Inc., Plano, TX (US)

(72) Inventors: Fangping Liu, San Jose, CA (US); Zhenjiang Li, San Jose, CA (US); Serhat Avci, San Jose, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days. days.

(21) Appl. No.: 14/965,576

(22) Filed: Dec. 10, 2015

(65) Prior Publication Data
US 2016/0173383 A1   Jun. 16, 2016

Related U.S. Application Data

(60) Provisional application No. 62/090,787, filed on Dec. 11, 2014.

(51) Int. Cl.
*H04L 12/801* (2013.01)
*H04L 12/825* (2013.01)
*H04L 12/835* (2013.01)

(52) U.S. Cl.
CPC .............. *H04L 47/30* (2013.01); *H04L 47/26* (2013.01); *H04L 47/29* (2013.01)

(58) Field of Classification Search
CPC .......... H04L 47/26; H04L 47/29; H04L 47/30
See application file for complete search history.

(56) References Cited

U.S. PATENT DOCUMENTS

| | | | | |
|---|---|---|---|---|
| 6,147,969 A * | 11/2000 | Benmohamed | ......... | H04L 47/10 370/230 |
| 7,286,552 B1 * | 10/2007 | Gupta | ................. | H04L 12/1881 370/232 |
| 8,031,709 B2 * | 10/2011 | Alexander, Jr. | ...... | H04L 12/4645 370/389 |
| 9,277,542 B2 * | 3/2016 | Cutler | ..................... | H04L 12/14 |
| 2003/0016628 A1* | 1/2003 | Kadambi | ............ | H04L 12/4641 370/235 |
| 2003/0067879 A1* | 4/2003 | Masunaga | ............... | H04L 47/10 370/235 |
| 2004/0071145 A1* | 4/2004 | Ha | ...................... | H04L 12/5601 370/395.43 |
| 2005/0100011 A1* | 5/2005 | Chiruvolu | ............... | H04L 47/10 370/389 |

(Continued)

*Primary Examiner* — Parth Patel
*Assistant Examiner* — Kai Chang
(74) *Attorney, Agent, or Firm* — Vierra Magen Marcus LLP

(57) ABSTRACT

An apparatus is configured to perform a method for congestion control in an Ethernet network. The method includes determining an egress queue congestion state for each of a plurality of egress queues. The method also includes determining an ingress queue congestion state for each of a plurality of ingress queues. The method further includes determining a flow control state for at least one of the ingress queues based on the determined egress queue congestion states and ingress queue congestion states. In addition, the method includes transmitting a flow control message to the at least one ingress queue based on the determined flow control state.

20 Claims, 10 Drawing Sheets

(56) References Cited

U.S. PATENT DOCUMENTS

| | | | | |
|---|---|---|---|---|
| 2006/0098672 A1* | 5/2006 | Schzukin | ............... | H04L 47/10 370/412 |
| 2007/0047535 A1* | 3/2007 | Varma | ..................... | H04L 47/10 370/360 |
| 2007/0153695 A1* | 7/2007 | Gholmieh | ........... | H04L 43/0882 370/235 |
| 2008/0062876 A1* | 3/2008 | Giroux | ............... | H04L 12/2856 370/235 |
| 2011/0019566 A1* | 1/2011 | Leemet | .................. | H04L 12/14 370/252 |
| 2012/0155256 A1* | 6/2012 | Pope | .................... | G06F 13/128 370/230 |
| 2014/0241160 A1* | 8/2014 | Kwan | .................... | H04L 47/24 370/235 |
| 2015/0055478 A1* | 2/2015 | Tabatabaee | ............. | H04L 47/11 370/236 |
| 2015/0350049 A1* | 12/2015 | Yang | .................... | H04L 47/115 370/236 |

\* cited by examiner

500 →

| Algorithm 1 Stop-Max Algorithm |
| --- |
| Require: $B_p^{o,+} = B_p^o$ + size of the new packet |
| Require: $B_p^{o,-} = B_p^o$ - size of the dequeued packet |
| 1: if Enqueue a packet at port $o$ with priority $p$ then |
| 2:    if $B_p^{o,+} \geq MAX$ threshold then |
| 3:       Drop the packet |
| 4:    else |
| 5:       Accept the packet |
| 6:       $B_p^o \leftarrow B_p^{o,+}$ |
| 7:       if $B_p^o \geq WARN$ threshold then |
| 8:          $C_p^{i,o} \leftarrow C_p^{i,o} + 1$ |
| 9:          if $B_p^o > XOFF$ threshold then |
| 10:             Detect the heaviest contributor $i^*$ |
| 11:             $i^* \leftarrow \arg\max_i C_p^{i,o}$ |
| 12:             Put it into congestion state |
| 13:             $E_p^{i^*,o} \leftarrow 1$ |
| 14: else if Dequeue a packet from port $o$ with priority $p$ then |
| 15:    Remove the packet |
| 16:    $B_p^o \leftarrow B_p^{o,-}$ |
| 17:    if $B_p^o \leq WARN$ threshold then |
| 18:       $C_p^{i,o} \leftarrow 0 \;\; \forall i$ |
| 19:    if $B_p^o \leq XON$ threshold then |
| 20:       $E_p^{i,o} \leftarrow 0 \;\; \forall i$ |

550 →

| Algorithm 2 Changes for Stop-Partial Policy |
| --- |
| 1: Detect the heaviest contributors |
| 2: Sort congestion counters $C_p^{i,o}$ based on $i$ |
| 3: Find the set of input ports $IP$ whose cumulative contribution passes the $CUT$ threshold |
| 4: $E_p^{i,o} \leftarrow 1 \;\; \forall i \in IP$ |

FIG. 5

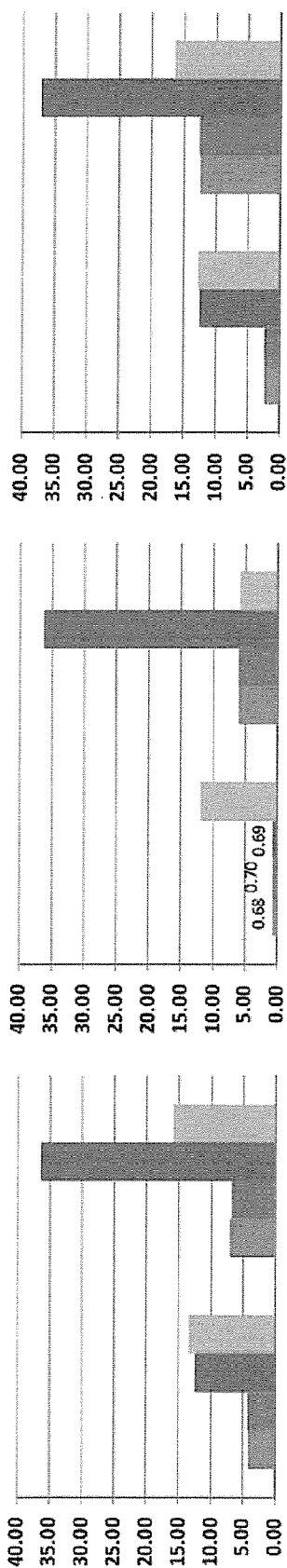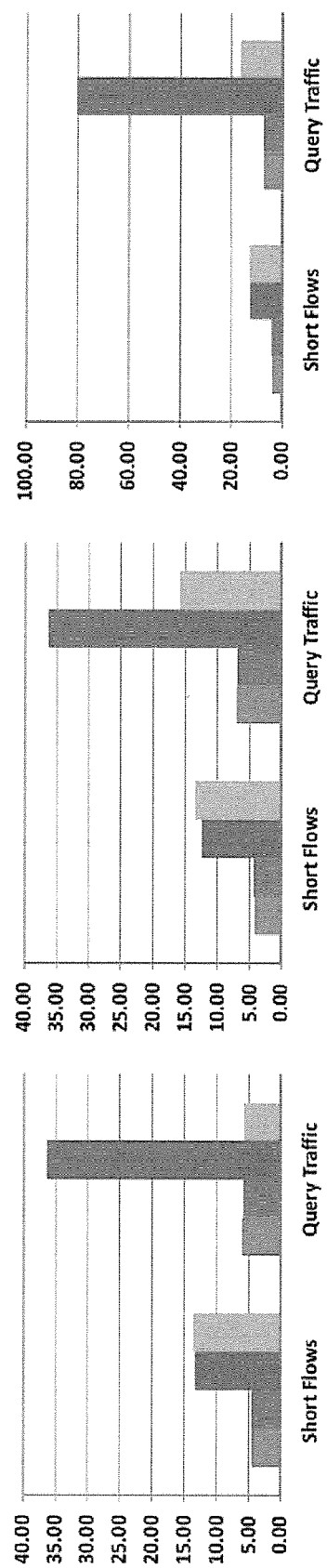
FIG. 8A  FIG. 8B  FIG. 8C
FIG. 8D  FIG. 8E  FIG. 8F

METHOD AND APPARATUS FOR PRIORITY FLOW AND CONGESTION CONTROL IN ETHERNET NETWORK

CROSS-REFERENCE TO RELATED APPLICATION(S) AND CLAIM OF PRIORITY

This application claims priority under 35 U.S.C. § 119(e) to U.S. Provisional Patent Application No. 62/090,787, filed Dec. 11, 2014, entitled "METHOD AND APPARATUS FOR PRIORITY FLOW AND CONGESTION CONTROL IN ETHERNET NETWORK", which is hereby incorporated by reference into this application as if fully set forth herein.

TECHNICAL FIELD

The present disclosure relates generally to Ethernet flow control, and more particularly, to a method and apparatus for priority flow and congestion control in an Ethernet network.

BACKGROUND

Ethernet Flow Control is a mechanism for temporarily stopping the transmission of data in Ethernet networks. Ethernet Flow Control has been in widespread use for several years. Recently, to support lossless traffic such as Fiber Channel over Ethernet (FCoE) in a unified Ethernet network, priority-based flow control (PFC) technology has been introduced and standardized by IEEE 802.1Qbb. This has been helpful in FCoE design, however, there are still issues with PFC.

SUMMARY

According to one embodiment, a method for congestion control in an Ethernet network is provided. The method includes determining an egress queue congestion state for each of a plurality of egress queues. The method also includes determining an ingress queue congestion state for each of a plurality of ingress queues. The method further includes determining a flow control state for at least one of the ingress queues based on the determined egress queue congestion states and ingress queue congestion states. In addition, the method includes transmitting a flow control message to the at least one ingress queue based on the determined flow control state.

According to another embodiment, an apparatus for congestion control in an Ethernet network is provided. The apparatus includes at least one memory and at least one processor coupled to the at least one memory. The at least one processor is configured to determine an egress queue congestion state for each of a plurality of egress queues, determine an ingress queue congestion state for each of a plurality of ingress queues, determine a flow control state for at least one of the ingress queues based on the determined egress queue congestion states and ingress queue congestion states, and transmit a flow control message to the at least one ingress queue based on the determined flow control state.

According to a further embodiment, there is provided a non-transitory computer readable medium embodying a computer program. The computer program includes computer readable program code for determining an egress queue congestion state for each of a plurality of egress queues, determining an ingress queue congestion state for each of a plurality of ingress queues, determining a flow control state for at least one of the ingress queues based on the determined egress queue congestion states and ingress queue congestion states, and transmitting a flow control message to the at least one ingress queue based on the determined flow control state.

Other technical features may be readily apparent to one skilled in the art from the following figures, descriptions, and claims.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 5 illustrates two example egress congestion management algorithms according to this disclosure;

FIGS. 8A-8F illustrates simulation results that show the benefits of PFCC according to this disclosure;

DETAILED DESCRIPTION

FIGS. 1 through 10, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
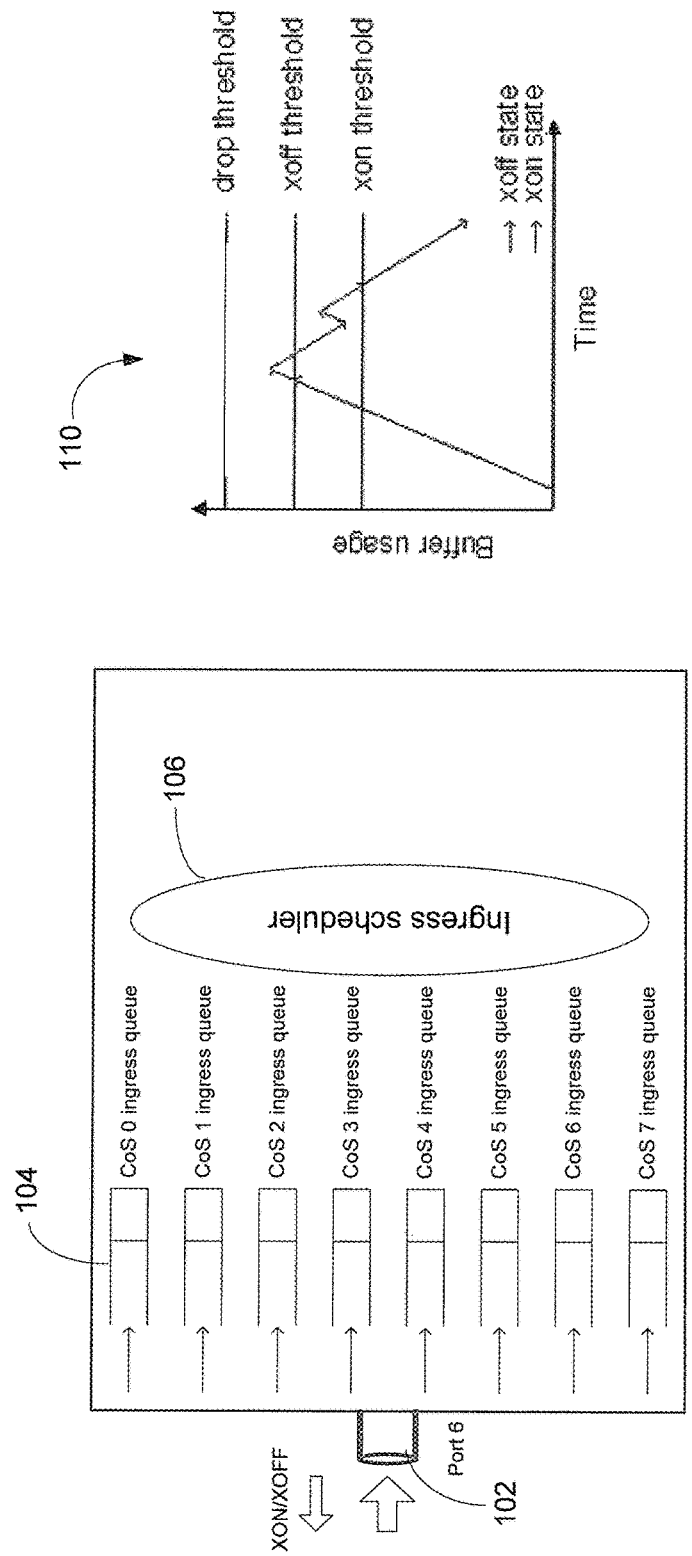
FIG. 1 shows an example of ingress queues for a single port in a network utilizing priority flow control (PFC) in accordance with IEEE 802.1Qbb.

FIG. 1 shows an example of ingress queues for a single port in a network utilizing priority flow control (PFC) in accordance with IEEE 802.1Qbb. As shown in FIG. 1, a single port 102 (e.g., Port 6) is associated with eight Class of Service (CoS) ingress queues 104 (also referred to as priorities) that are managed by an ingress scheduler 106. With PFC as a link level flow control mechanism, a switch at a receiving end of a link can use a PFC use per priority pause frame to notify the hop link partner to pause sending frames of certain priorities until further notification. For example, in FIG. 1, the ingress scheduler 106 monitors per priority (or per queue) ingress buffer usage and notifies a previous hop link partner through per priority pause frames. For example, as shown in the buffer usage chart 110, when the usage of a queue crosses a first threshold (the XON threshold), an ingress queue congestion state can be set to XOFF (i.e., a congestion value) and an XOFF notification can be sent to the hop link partner. This notifies the hop link partner to pause sending frames until the buffer usage drops back below the XON threshold, at which time the ingress queue congestion state can be set to XON (a congestion clear value), and an XON notification can be sent to the hop link partner. These notifications, however, stop at the previous hop and don't propagate all the way back to the traffic senders. Also, this process allows a high traffic sender to stalk low volume traffic, which is unnecessary, and can cause network blocking issues. In addition, PFC only prevents ingress queue congestion. PFC does not protect against egress queue congestion. A credit based link level flow control technique is used in InfiniBand and operates very similarly to PFC. Like PFC, it addresses congestion only at the ingress buffer.

Figure 2:
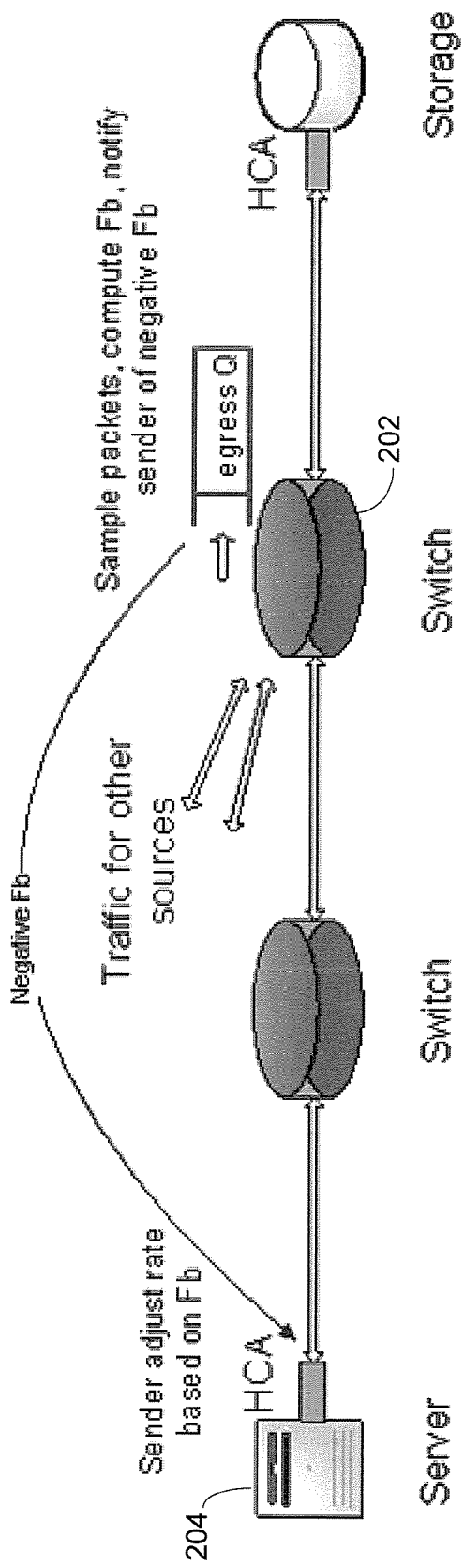
FIG. 2 illustrates an example of congestion control for a single Class of Service (CoS) in a network using quantized congestion notification (QCN) in accordance with IEEE 802.1Qau.

FIG. 2 illustrates an example of congestion control for a single Class of Service (CoS) in a network using quantized congestion notification (QCN) in accordance with IEEE 802.1Qau. As a congestion notification mechanism, QCN allows an Ethernet switch to selectively notify a traffic sender to reduce volume when congestion is detected. As shown in FIG. 2, a switch 202 associated with an egress queue for the single CoS receives packets sent from a server 204. The switch 202 and the server 204 are in the same virtual local area network (VLAN). The switch 202 samples the incoming packets and detects congestion conditions in the network. Based on the detected congestion, the switch 202 determines feedback (Fb), and sends the feedback to the server 204. The server 204 then adjusts its rate of transmission based on the feedback. QCN is efficient in relieving egress queue congestion. However, QCN has some drawbacks. For example, QCN only works within a Layer 2 Ethernet network boundary, and it does not work across virtual local area network (VLAN) boundaries. QCN also requires a complicated network setup and may also put requirements on host network adaptors for deployment. Because of this, QCN is rarely deployed.

Both PFC and QCN contribute to lossless traffic handling. However, there are many cases that cause packet loss that are not handled. Simply put, PFC plus QCN alone are not sufficient to deliver data center lossless service. PFC is only a link scope flow control that only considers ingress queue status. QCN considers only egress queue status when detecting congestion, and only notify senders which are in the same VLAN.

Thus, a mechanism is needed that provides flow control in a network with a larger scope (i.e., across multiple VLANs), and that addresses both ingress queue congestion and egress queue congestion, and that avoids network head of line blocking.

To address these and other issues, embodiments of this disclosure provide a solution for priority flow and congestion control (PFCC) in Ethernet networks. In particular, the disclosed embodiments provide procedures allowing an Ethernet switch, when detecting congestion at egress, to identify potential ingress link partners as major congestion culprits, send PFC frames to those link partners, and hence, propagate egress congestion control towards selected sources. In some embodiments, an IEEE 802.1Qbb pause frame packet format can be used.

The disclosed embodiments allow for early prediction of egress congestion. In some embodiments, an Ethernet switch uses specific egress queue management state machines to early detect potential congestion at egress queues. The disclosed embodiments also feature algorithms that create an association between egress queues and traffic source ports, use egress congestion states for those associations, and identify major congestion contributors. The disclosed embodiments combine ingress and egress congestion states for link flow control, to avoid head of line blocking, and to avoid light flows being delayed due to heavy flows. When propagating congestion and flow control from switch egress to switch ingress ports, VLAN boundaries can be crossed. This egress to ingress congestion propagation mechanism combined with IEEE 802.1Qbb PFC allows a PFCC switch to notify heavy traffic senders across VLAN boundaries, thereby reducing network congestion, while allowing uninterrupted light traffic flows for lossless services.

Figure 3:
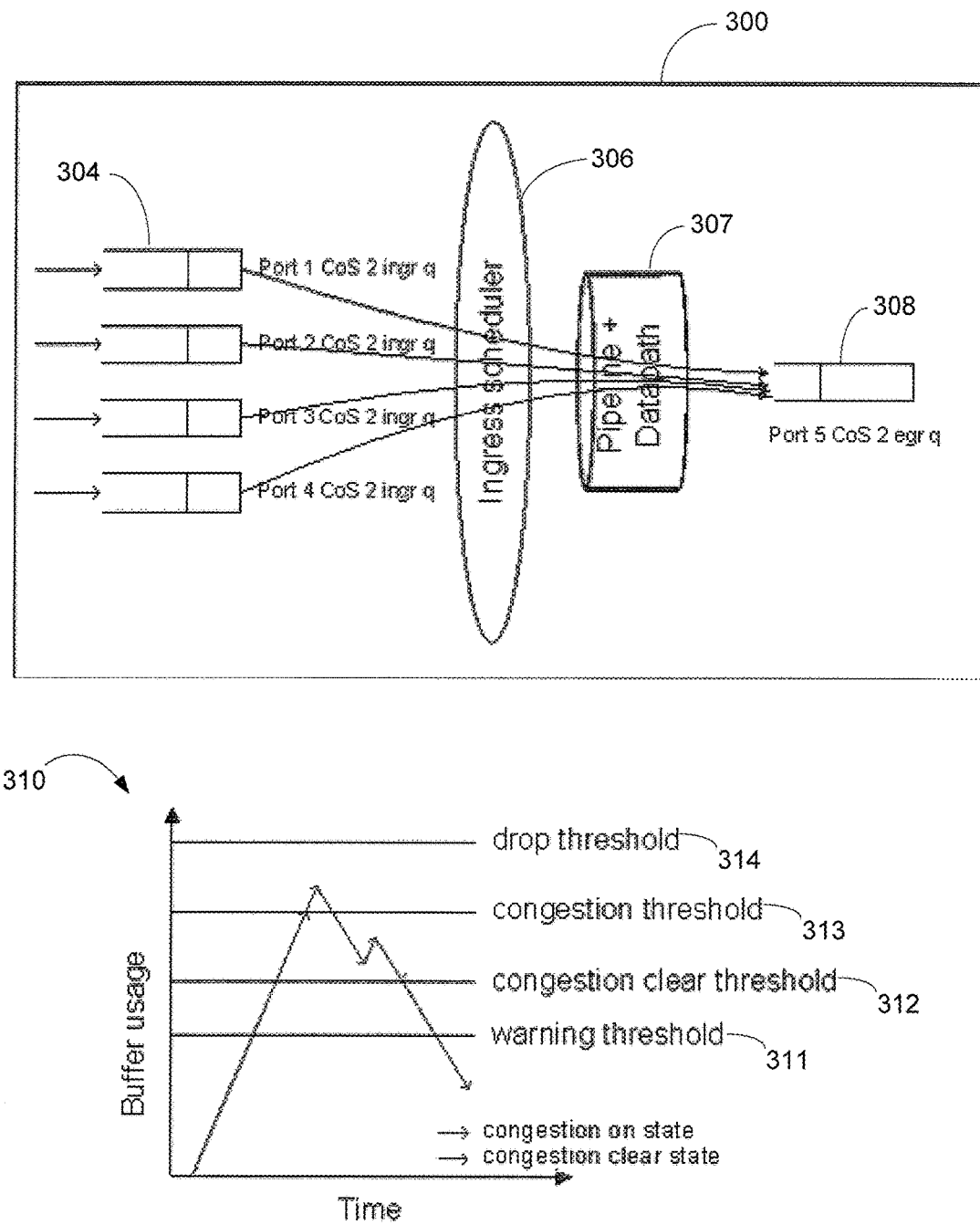
FIG. 3 illustrates an example application of egress congestion management using priority flow and congestion control (PFCC) in an Ethernet network according to this disclosure.

FIG. 3 illustrates an example application of egress congestion management using priority flow and congestion control (PFCC) in an Ethernet network according to this disclosure. With PFCC, both an ingress queueing state and an egress queue congestion state are considered. In FIG. 3, concepts associated with egress queue congestion are explained. Ingress flow control is explained later with respect to FIGS. 6A and 6B.

As shown in FIG. 3, a network 300 includes a plurality of CoS ingress queues 304, an ingress scheduler 306, a pipeline 307, and a plurality of CoS egress queues 308. Each of the CoS ingress queues 304 and CoS egress queues 308 is associated with a particular port (e.g., ingress port or egress port) and a particular CoS. While networks typically include many CoS egress queues, for ease of explanation, only a single CoS egress queue 308 is depicted and described in FIG. 3. However, it will be understood that the network 300 can include many more than one CoS egress queue 308, and each of the CoS egress queues 308 can operate in a same or similar manner as described.

The buffer usage chart 310 shows the different buffer usage thresholds that are used in egress congestion management. These include a warning threshold 311, a congestion clear threshold 312, a congestion threshold 313, and a drop threshold 314. These thresholds are explained in greater detail below.

The CoS ingress queues 304 are managed by the ingress scheduler 306. Under the control of the ingress scheduler 306, the ingress queues 304 transmit data packets that are sent through the pipeline 307 to the CoS egress queue 308. The number of packets sent by each CoS ingress queue 304 to the CoS egress queue 308 is variable, and is typically different among the CoS ingress queues 304. That is, a first one of the CoS ingress queues 304 may send a different number of data packets to the CoS egress queue 308 over a particular period of time than a second one of the CoS ingress queues 304. Thus, in FIG. 3, different CoS ingress queues 304 are responsible for different levels of contributions to congestion at the CoS egress queue 308.

Figure 4:
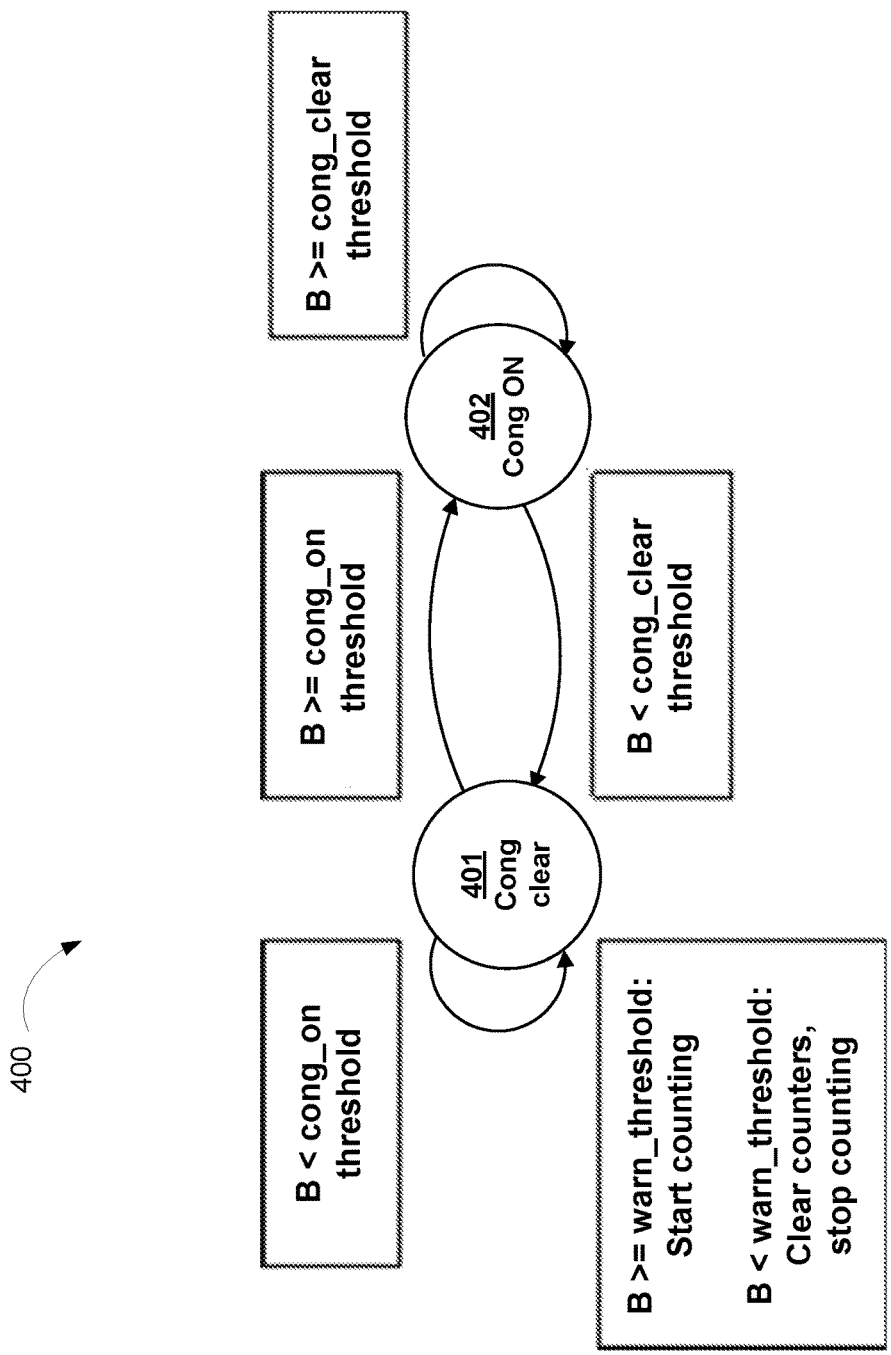
FIG. 4 illustrates a congestion state machine associated with egress congestion management using PFCC according to this disclosure.

A congestion state, eState[egr_port][cos][ingr_port] or $E_p^{i,o}$, can be used to identify the state of congestion for each ingress queue/egress queue/CoS association. Thus, each congestion state $E_p^{i,o}$ is based on three different values: i=ingr_port=ingress queue (input), o=egr_port=egress queue (output), and p=CoS (priority). FIG. 4 illustrates a congestion state machine 400 associated with the congestion state $E_p^{i,o}$. To keep track of the congestion at each egress queue, including the ingress queues that are responsible for the congestion at the egress queue, a counter, PFCC_counter [egr_port][cos][ingr_port] or $C_p^{i,o}$, is defined for each ingress queue/egress queue/CoS association. At every egress port queue, a counter mechanism starts packet counting when queue usage reaches a threshold, and the counters are tracked based on ingress ports. The counters are used to track every packet enqueued into the given egress port CoS queue. The counters are used to determine the top ingress port contributors to the congestion. Thus, in FIG. 3, the CoS egress queue 308 has a counter $C_p^{i,o}$ and a congestion state $E_p^{i,o}$ for each ingress queue 304 to identify congestion and keep track of which ingress queue is responsible for the congestion. Using the counters, the CoS egress queue 308 can determine which ingress port is sending the greatest number of packets.

Because congestion conditions are fluid and change over time, the congestion states $E_p^{i,o}$ and the counters $C_p^{i,o}$ need to be regularly refreshed so that the information does not become outdated. To do this, the buffer usage thresholds 311-314 are used. Turning again to FIG. 4, every congestion state $E_p^{i,o}$ starts at the Congestion Clear state 401 ($E_p^{i,o}$=cong_clear). For example, the congestion states $E_p^{i,o}$ for the CoS egress queue 308 starts at the Congestion Clear state 401. When the buffer usage at the CoS egress queue 308 reaches the warning threshold 311, the counter mechanism starts packet counting for each of the CoS ingress queues 304 using the respective counters $C_p^{i,o}$. Every additional packet that is transmitted to the CoS egress queue 308 is counted for its transmitting CoS ingress queue 304 by increasing the respective counter $C_p^{i,o}$.

When the buffer usage for the CoS egress queue 308 reaches the congestion threshold 313, $E_p^{i,o}$ is set to the Congestion On state 402 ($E_p^{i,o}$=cong_on) for the top ingress queue contributors among the CoS ingress queues 304 which are not yet in Congestion On state 402, based on the value of the counters at that time. For example, among the CoS ingress queues 304, the counters may have values as follows:

Port 1: $C_p^{i,o}$=10,
Port 2: $C_p^{i,o}$=2,
Port 3: $C_p^{i,o}$=8,
Port 4: $C_p^{i,o}$=0.

Since Port 1 and Port 3 are the top contributors to congestion, $E_p^{i,o}$ is set to Congestion On state 402 for Port 1 and Port 3. The top contributors can be determined using one or more algorithms, such as the algorithms shown in FIG. 5, discussed below.

When the buffer usage for the CoS egress queue 308 drops below the congestion clear threshold 312, the CoS egress queue 308 is out of the congestion state. All congestion states $E_p^{i,o}$ for the CoS egress queue 308 are set to the Congestion Clear state 401 ($E_p^{i,o}$=cong_clear), all congestion packet counting for the CoS egress queue 308 is stopped, and all counters $C_p^{i,o}$ are reset to zero. In some embodiments, congestion packet counting is stopped and counters $C_p^{i,o}$ are reset when the buffer usage for the CoS egress queue 308 drops below the warning threshold 311. In some embodiments, the warning threshold 311 and the congestion clear threshold 312 are set to the same value.

These PFCC techniques can be implemented to achieve lossless service by ensuring that the buffer usage for the CoS egress queue 308 never reaches the drop threshold 314. If the buffer usage were to reach the drop threshold 314, a packet drop procedure, such as tail drop or WRED (weighted random early detection), could be activated. However, the PFCC techniques disclosed herein should prevent this from happening.

FIG. 5 illustrates two example egress congestion management algorithms according to this disclosure. The Stop-Max algorithm 500 and the Stop-Partial algorithm 550 can be performed to identify and set the congestion state of the egress queues and to manage incoming data packets using the techniques described with respect to FIGS. 3 and 4. The algorithms 500, 550 can be performed to determine the ingress queues that are the top contributors to the egress queue congestion. For example, the algorithms 500, 550 can be performed to identify the ingress queues that contribute 80% of traffic to the egress queue. While the algorithms 500, 550 are example algorithms, this disclosure is not limited hereto. Other algorithms performing the same or similar operations may be used in accordance with this disclosure.

Figure 6A:
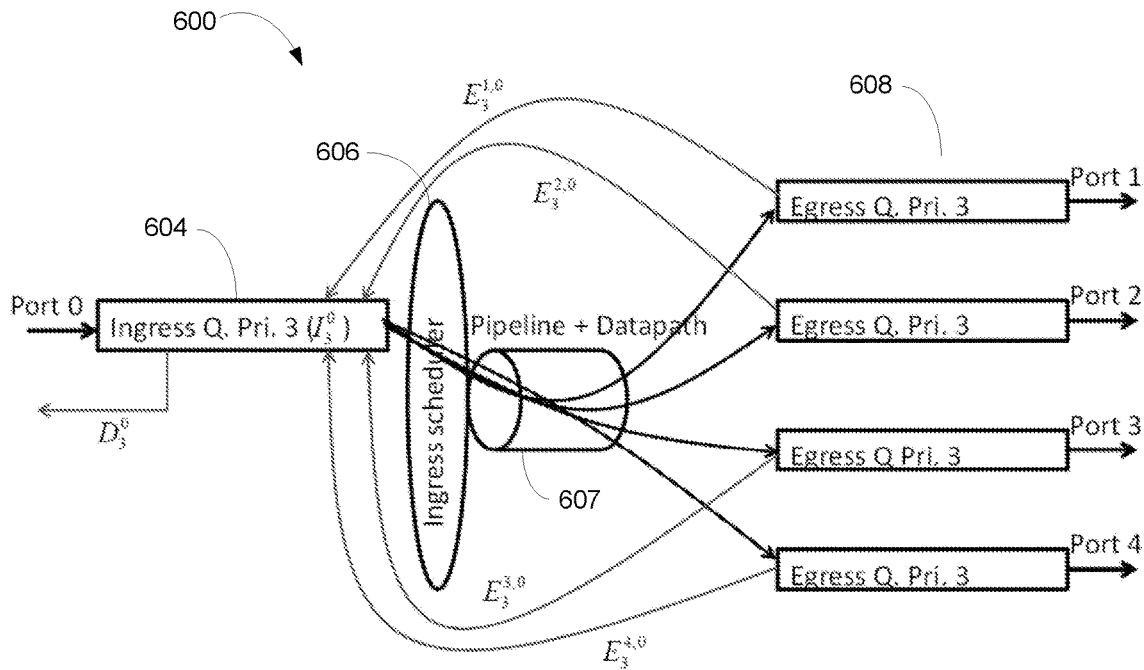
FIG. 6A illustrates an example application of ingress flow control management using PFCC in an Ethernet network according to this disclosure.

FIG. 6A illustrates an example application of ingress flow control management using PFCC in an Ethernet network according to this disclosure. The ingress flow control techniques described here can be performed in conjunction with the egress congestion management principles described in FIG. 3. Of course, these ingress flow control techniques could be used in any other suitable system as well.

As shown in FIG. 6A, a network 600 includes a CoS ingress queue 604, an ingress scheduler 606, a pipeline 607, and a plurality of CoS egress queues 608. While only one CoS ingress queue 604 is depicted in FIG. 6A, it will be understood that the network 600 can include multiple CoS ingress queues such as shown in FIG. 1. The CoS ingress queue 604 and each of the CoS egress queues 608 is associated with a particular port (e.g., ingress port or egress port) and a particular CoS. In particular, FIG. 6A illustrates Port 0 CoS 3 (or Priority 3) ingress queue packet queueing, where data traffic from the CoS ingress queue 604 associated with Port 0 Cos 3 is sent to multiple ones of the CoS egress queues 608.

Using PFCC, when determining the state of flow control for a certain CoS ingress queue (e.g., the CoS ingress queue 604, which is associated with Port 0 Cos 3), both an ingress queueing congestion state and an egress queue congestion state are considered. In particular, all egress queues to whose congestion state the ingress queue has contributed are taken into consideration. For example, in FIG. 6A, since the CoS ingress queue 604 has contributed to the CoS egress queues 608 associated with Ports 1-4 CoS 3, the four CoS egress queues 608 depicted in FIG. 6A are considered. The egress queue congestion state for each of the CoS egress queues 608 is the egress flow control state induced from egress port queue congestion, and is determined as described with respect to FIGS. 3 and 4. The ingress queue congestion state, iState[ingr_port][cos] or $I_p^i$, is determined using the PFC techniques described with respect to FIG. 1.

At the ingress queue, the flow control state $D_p^i$ for a CoS ingress queue 604 is derived from the iState for the CoS ingress queue 604 and all eStates of the affected CoS egress queues 608. Expressed as a mathematical function, this relationship can be described according to Equation (1):

$$D_p^i = I_p^i \vee \bigvee_{\substack{o \in P, \\ o \neq i}} E_p^{i,o} \quad \forall i \in P, 1 \leq p \leq P, \qquad (1)$$

where $\vee$ represents a mathematical OR operation. In some embodiments, implementation of Equation (1) is based upon $E_p^{i,o}$ and $I_p^i$ being equal to 1 for a cong_on state and $E_p^{i,o}$ and $I_p^i$ being equal to 0 for a cong_clear state.

Figure 6B:
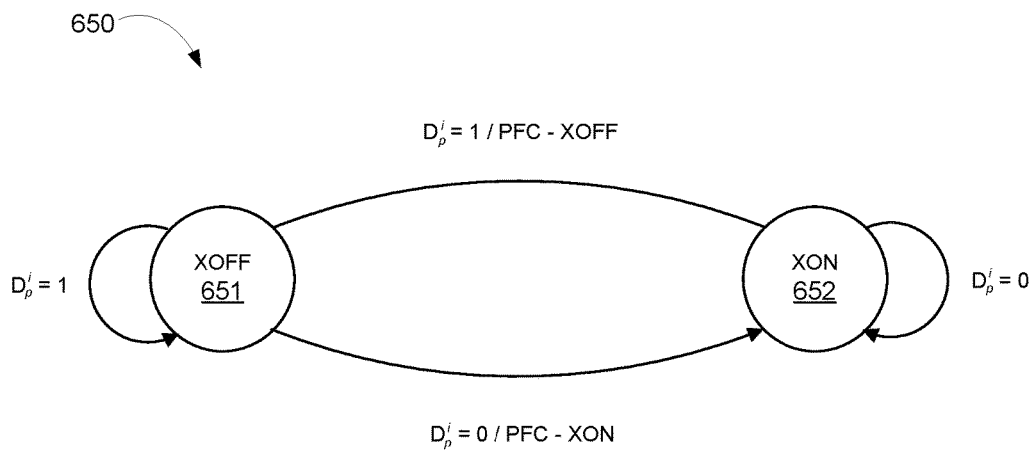
FIG. 6B illustrates a flow control state machine based on a flow control state according to this disclosure.

FIG. 6B illustrates a flow control state machine 650 based on the flow control state $D_p^i$. The flow control state $D_p^i$ is used to determine whether to send a PFC XOFF or XON frame to a previous hop link partner to either pause transmission of packets (XOFF) or resume transmission of packets (XON). As expressed in Equation (1), when $I_p^i$=XOFF or any of the $E_p^{i,o}$ state values=cong_on, the flow control state $D_p^i$ is 1 and the PFC flow control state is at the XOFF state 651. When the PFC flow control state is at the XOFF state 651, a PFC XOFF frame is sent to a link partner for the CoS to pause transmission of packets. Conversely, when $I_p^i$=XON and all of the $E_p^{i,o}$ state values=cong_clear, the flow control state $D_p^i$ is 0 and the PFC flow control state is at the XON state 652. When the PFC flow control state is at the XON state 652, a PFC XON frame is sent to the link partner to resume transmission.

Figure 7:
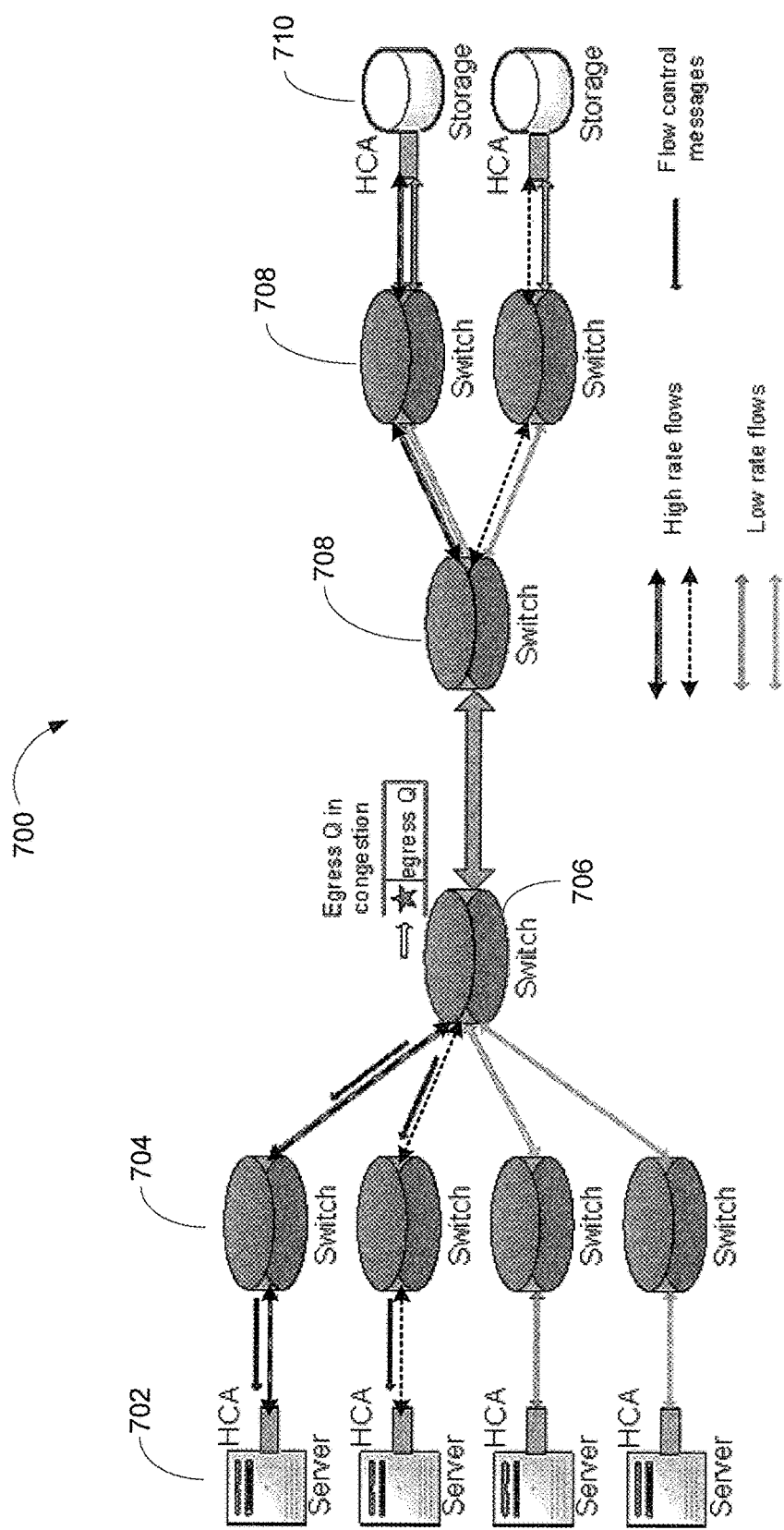
FIG. 7 illustrates an example of flow control and congestion notification to the top contributing sources in a network using PFCC according to this disclosure.

FIG. 7 illustrates an example of flow control and congestion notification to the top contributing sources in a network using PFCC according to this disclosure. As shown in FIG. 7, the network 700 includes a plurality of ingress queues 702 (represented as servers), a plurality of first hop switches 704, a second hop switch 706, a plurality of later hop switches 708, and a plurality of data destinations 710 (represented as storages). In the network 700, the traffic flows from the ingress queues 702 have the same class of service and require lossless service. The traffic flows merge at the second hop switch 706, causing egress congestion. The traffic flows from two of the ingress queues 702 are high rate traffics flows, identified by the dashed arrows and dotted arrows. These high traffic flows are selected for flow control and congestion notification using PFCC. Using the methods described herein, flow control messages (e.g., XOFF messages) are sent to the ingress queues 702 associated with the high traffic flows. In response to the flow control messages, the high traffic ingress queues 702 lower their traffic volume. The low rate traffic senders are not affected.

The embodiments of PFCC as described herein provide a number of advantageous benefits. Besides ingress congestion handling, PFCC is able to detect egress congestion and propagate the detection results to the ingress port, hence providing flow control to the previous hop of the traffic. Since PFCC works in every hop of the traffic path, PFCC can work in an end to end fashion, rather than link scope flow control (such as in IEEE 802.1Qbb PFC). PFCC can notify traffic sources which belong to VLANs different than the switch egress port under congestion.

In addition, PFCC only controls selected high traffic sources, namely the sources that contribute most to the egress congestion. Both flow control and congestion notification mechanisms are combined in PFCC, and work seamlessly. Since PFCC only controls higher volume traffic sources, and allows low volume traffic to proceed, the issue of high volume traffic flows blocking low volume traffic flows is avoided when the high traffic flow and the low traffic flow share resources in their paths.

FIGS. 8A-8F illustrates simulation results that show the benefits of PFCC according to this disclosure. Each of FIGS. 8A-8F shows results from an example simulation scenario that compare two schemes of PFCC with two schemes of PFC for normal lossy web transaction traffic. Short flows represent time-sensitive traffic that needs to be processed quickly. Query traffic represents lower-volume traffic that is associated with a higher number of senders (e.g., greater than forty) per receiver. In each group of four bars, the left two bars represent the tail flow completion time (FCT) (e.g., a web page load time) of the two PFCC schemes, and the right two bars represent the tail FCT of the two PFC schemes. The results in FIGS. 8A-8F show that PFCC improves tail FCT by 3 to 6 times over PFC.

Figure 9:
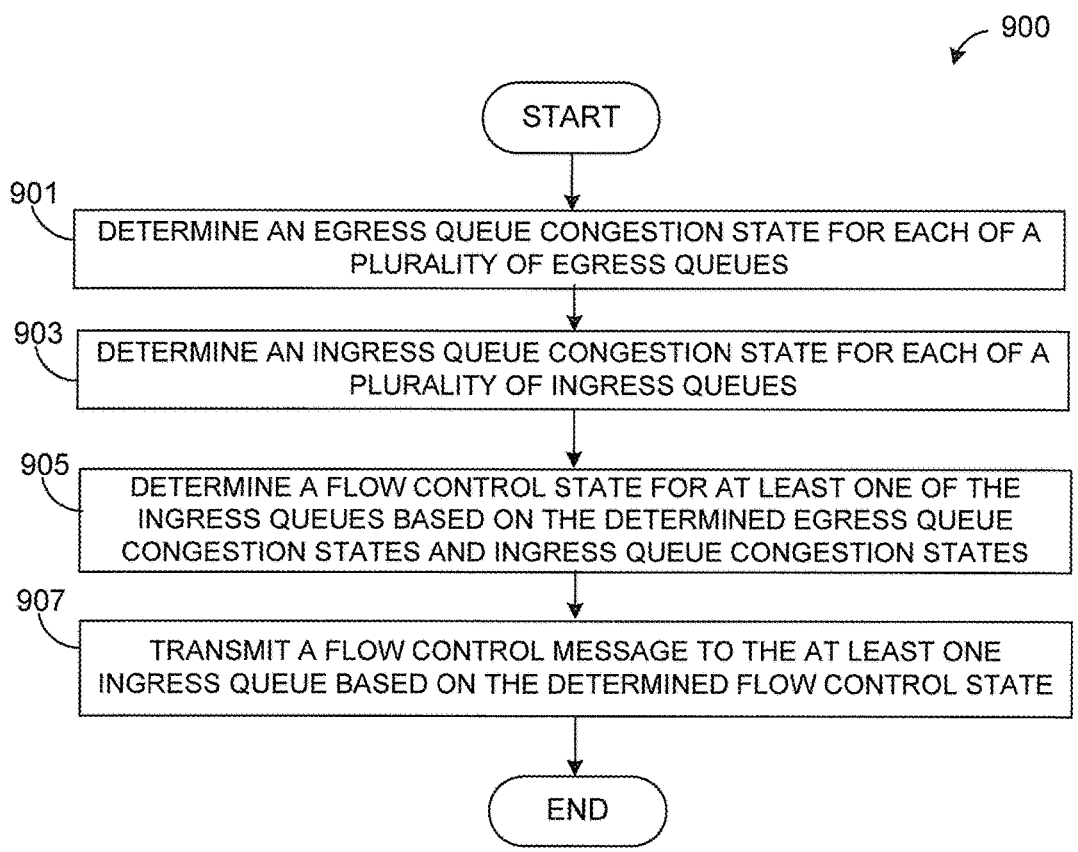
FIG. 9 illustrates a method for congestion control in an Ethernet network according to this disclosure.

FIG. 9 illustrates a method for congestion control in an Ethernet network according to this disclosure. The method 900 shown in FIG. 9 is based on the key concepts described above. The method 900 may be performed by one of the components of FIG. 3 or FIG. 6A (e.g., the ingress schedulers 306, 606) or the network component 1000 of FIG. 10, described below. However, the method 900 could also be used with any other suitable device or system.

At operation 901, an egress queue congestion state is determined for each of a plurality of egress queues. This may include the ingress scheduler counting packets transmitted by each ingress queue to the egress queue when an egress queue buffer usage reaches a warning threshold, and when the egress queue buffer usage reaches a congestion threshold, the ingress scheduler sets the egress queue congestion state to a congestion value for one or more top congestion contributors among the ingress queues based on the counted packets. In some embodiments, the egress queue congestion state is determined using a Stop-Max algorithm or a Stop-Partial algorithm.

At operation 903, an ingress queue congestion state is determined for each of a plurality of ingress queues. This may include the ingress scheduler using PFC techniques to set the ingress queue congestion state to a congestion value when an ingress queue buffer usage reaches a first threshold, and when the ingress queue buffer usage drops below a second threshold, the ingress scheduler sets the ingress queue congestion state to a congestion clear value.

At operation 905, a flow control state is determined for at least one of the ingress queues based on the determined egress queue congestion states and ingress queue congestion states. This may include determining the flow control state according to Equation (1), as described above. Then, at operation 907, a flow control message (e.g., an XOFF or XON message) is transmitted to the at least one ingress queue based on the determined flow control state.

Although FIG. 9 illustrates one example of a method 900 for congestion control in an Ethernet network, various changes may be made to FIG. 9. For example, while shown as a series of steps, various steps shown in FIG. 9 could overlap, occur in parallel, occur in a different order, or occur multiple times. Moreover, some steps could be combined or removed and additional steps could be added according to particular needs.

Figure 10:
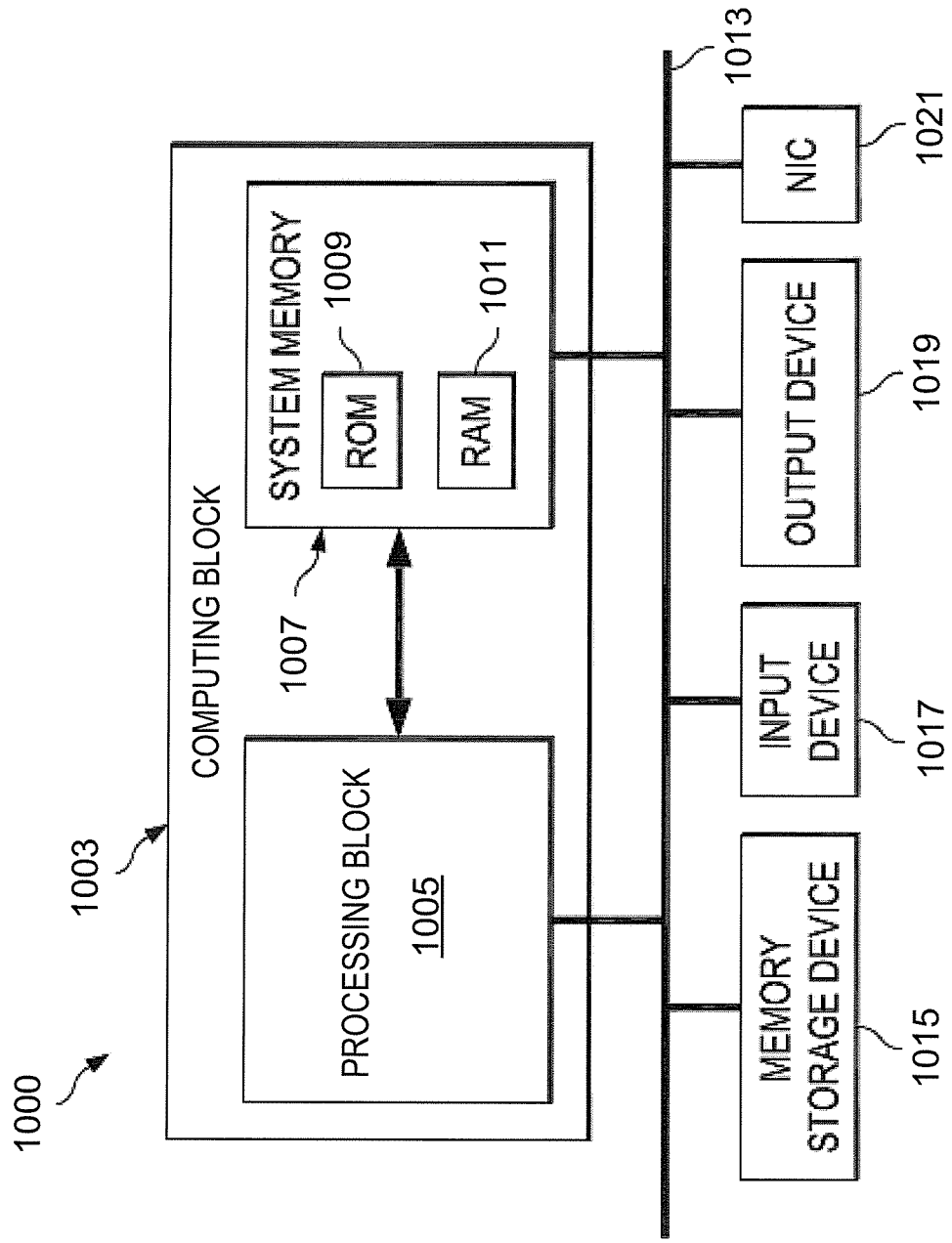
FIG. 10 illustrates a general-purpose network component suitable for implementing one or more embodiments disclosed herein.

The network components described above may be implemented on any general-purpose network component, such as a computer or network component with sufficient processing power, memory resources, and network throughput capability to handle the necessary workload placed upon it. FIG. 10 illustrates a typical, general-purpose network component 1000 suitable for implementing one or more embodiments disclosed herein. The network component 1000 includes a computing block 1003 with a processing unit 1005 and a system memory 1007. The processing unit 1005 may be any type of programmable electronic device for executing software instructions, but will conventionally be one or more microprocessors. The system memory 1007 may include both a read-only memory (ROM) 1009 and a random access memory (RAM) 1011. As will be appreciated by those of skill in the art, both the read-only memory 1009 and the random access memory 1011 may store software instructions for execution by the processing unit 1005.

The processing unit 1005 and the system memory 1007 are connected, either directly or indirectly, through a bus 1013 or alternate communication structure, to one or more peripheral devices. For example, the processing unit 1005 or the system memory 1007 may be directly or indirectly connected to one or more additional memory storage devices 1015. The memory storage devices 1015 may include, for example, a "hard" magnetic disk drive, a solid state disk drive, an optical disk drive, and a removable disk drive. The processing unit 1005 and the system memory 1007 also may be directly or indirectly connected to one or more input devices 1017 and one or more output devices 1019. The input devices 1017 may include, for example, a keyboard, a pointing device (such as a mouse, touchpad, stylus, trackball, or joystick), a touch screen, a scanner, a camera, and a microphone. The output devices 1019 may include, for example, a display device, a printer and speakers. Such a display device may be configured to display video images. With various examples of the network component 1000, one or more of the peripheral devices 1015-1019 may be internally housed with the computing block 1003. Alternately, one or more of the peripheral devices 1015-1019 may be external to the housing for the computing block 1003 and connected to the bus 1013 through, for example, a Universal Serial Bus (USB) connection or a digital visual interface (DVI) connection.

With some implementations, the computing block 1003 may also be directly or indirectly connected to one or more network interfaces cards (NIC) 1021, for communicating with other devices making up a network. The network interface cards 1021 translate data and control signals from the computing block 1003 into network messages according to one or more communication protocols, such as the transmission control protocol (TCP) and the Internet protocol (IP). Also, the network interface cards 1021 may employ any suitable connection agent (or combination of agents) for connecting to a network, including, for example, a wireless transceiver, a modem, or an Ethernet connection.

It should be appreciated that the network component 1000 is illustrated as an example only, and it not intended to be limiting. Various embodiments of this disclosure may be implemented using one or more computing devices that include the components of the network component 1000 illustrated in FIG. 10, or which include an alternate combination of components, including components that are not shown in FIG. 10. For example, various embodiments may be implemented using a multi-processor computer, a plurality of single and/or multiprocessor computers arranged into a network, or some combination of both.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A computer-implemented method for congestion control in an Ethernet network, the method comprising:
   determining an egress queue congestion state for each of a plurality of egress queues;
   determining an ingress queue congestion state for each of a plurality of ingress queues;
   determining a flow control state for at least one of the ingress queues based on a combination of the determined egress queue congestion states for which the at least one ingress queue has contributed to congestion and the determined ingress queue congestion states; and
   transmitting a flow control message to the at least one ingress queue based on the determined flow control state to control a flow of data traffic, wherein
   determining the egress congestion states comprises identifying the ingress queues causing a greatest volume of data traffic, sending priority flow control (PFC) frames to the identified ingress queues and propagating egress congestion flow control towards an originating source of the data traffic to limit the data traffic while allowing the data traffic to continue flowing at each of the other at least one ingress queues.

2. The method of claim 1, wherein the flow control state is determined according to the equation:

$$D_p^i = I_p^i \vee \bigvee_{\substack{o \in P, \\ o \neq i}} E_p^{i,o} \quad \forall\, i \in P,\, 1 \leq p \leq P,$$

where $D_p^i$; is the flow control state, $I_p^i$ is the ingress queue congestion state, and $E_p^{i,o}$ is the egress queue congestion state, i represents an ingress queue, o represents an egress queue, and p represents a class of service (CoS).

3. The method of claim 1, wherein determining the egress queue congestion state comprises:
   when an egress queue buffer usage reaches a first threshold, counting packets transmitted by each ingress queue to the egress queue; and
   when the egress queue buffer usage reaches a second threshold, setting the egress queue congestion state to a congestion value for one or more top congestion contributors among the ingress queues based on the counted packets.

4. The method of claim 3, wherein determining the egress queue congestion state further comprises:
   when the egress queue buffer usage drops below a third threshold, setting the egress queue congestion state to a congestion clear value.

5. The method of claim 1, wherein the egress queue congestion state is determined using a Stop-Max algorithm or a Stop-Partial algorithm.

6. The method of claim 1, wherein determining the ingress queue congestion state comprises:
   when an ingress queue buffer usage reaches a first threshold, setting the ingress queue congestion state to a congestion value; and when the ingress queue buffer usage drops below a second threshold, setting the ingress queue congestion state to a congestion clear value.

7. The method of claim 1, wherein the transmitting a flow control message to the at least one ingress queue is across one or more virtual local area network (VLAN) boundaries.

8. The method of claim 1, wherein the PFC frames sent to the identified ingress queues are sent hop by hop back to the originating source of the data traffic.

9. An apparatus for congestion control in an Ethernet network, the apparatus comprising:
a non-transitory memory storage comprising instructions; and
one or more processors in communication with the memory, wherein the one or more processors execute the instructions to:
determine an egress queue congestion state for each of a plurality of egress queues;
determine an ingress queue congestion state for each of a plurality of ingress queues;
determine a flow control state for at least one of the ingress queues based on a combination of the determined egress queue congestion states for which the at least one ingress queue has contributed to congestion and the determined ingress queue congestion states; and
transmit a flow control message to the at least one ingress queue based on the determined flow control state to control a flow of data traffic, wherein
determining the egress congestion states comprises identifying the ingress queues causing a greatest volume of data traffic, sending priority flow control (PFC) frames to the identified ingress queues and propagating egress congestion flow control towards an originating source of the data traffic to limit the data traffic while allowing the data traffic to continue flowing at each of the other at least one ingress queues.

10. The apparatus of claim 9, wherein the flow control state is determined according to the equation:

$$D_p^i = I_p^i \vee \bigvee_{\substack{o \in P, \\ o \neq i}} E_p^{i,o} \quad \forall\, i \in P, 1 \leq p \leq P,$$

where $D_p^i$ is the flow control state, $I_p^i$ is the ingress queue congestion state, and $E_p^{i,o}$ is the egress queue congestion state, i represents an ingress queue, o represents an egress queue, and p represents a class of service (CoS).

11. The apparatus of claim 9, wherein to determine the egress queue congestion state, the at least one processor is configured to:
when an egress queue buffer usage reaches a first threshold, count packets transmitted by each ingress queue to the egress queue; and
when the egress queue buffer usage reaches a second threshold, set the egress queue congestion state to a congestion value for one or more top congestion contributors among the ingress queues based on the counted packets.

12. The apparatus of claim 11, wherein to determine the egress queue congestion state, the at least one processor is further configured to:
when the egress queue buffer usage drops below a third threshold, set the egress queue congestion state to a congestion clear value.

13. The apparatus of claim 9, wherein the egress queue congestion state is determined using a Stop-Max algorithm or a Stop-Partial algorithm.

14. The apparatus of claim 9, wherein to determine the ingress queue congestion state, the at least one processor is configured to:
when an ingress queue buffer usage reaches a first threshold, set the ingress queue congestion state to a congestion value; and
when the ingress queue buffer usage drops below a second threshold, set the ingress queue congestion state to a congestion clear value.

15. A non-transitory computer readable medium storing computer instructions for congestion control in an Ethernet network, that when executed by one or more processors, cause the one or more processors to perform the steps of:
determining an egress queue congestion state for each of a plurality of egress queues;
determining an ingress queue congestion state for each of a plurality of ingress queues;
determining a flow control state for at least one of the ingress queues based on a combination of the determined egress queue congestion states for which the at least one ingress queue has contributed to congestion and the determined ingress queue congestion states; and
transmitting a flow control message to the at least one ingress queue based on the determined flow control state to control a flow of data traffic, wherein
determining the egress congestion states comprises identifying the ingress queues causing a greatest volume of data traffic, sending priority flow control (PFC) frames to the identified ingress queues and propagating egress congestion flow control towards an originating source of the data traffic to limit the data traffic while allowing the data traffic to continue flowing at each of the other at least one ingress queues.

16. The non-transitory computer readable medium of claim 15, wherein the flow control state is determined according to the equation:

$$D_p^i = I_p^i \vee \bigvee_{\substack{o \in P, \\ o \neq i}} E_p^{i,o} \quad \forall\, i \in P, 1 \leq p \leq P,$$

where $D_p^i$ is the flow control state, $I_p^i$ is the ingress queue congestion state, and $E_p^{i,o}$ is the egress queue congestion state, i represents an ingress queue, o represents an egress queue, and p represents a class of service (CoS).

17. The non-transitory computer readable medium of claim 15, wherein determining the egress queue congestion state causes the one or more processors to perform the steps of:
when an egress queue buffer usage reaches a first threshold, counting packets transmitted by each ingress queue to the egress queue; and
when the egress queue buffer usage reaches a second threshold, setting the egress queue congestion state to a congestion value for one or more top congestion contributors among the ingress queues based on the counted packets.

18. The non-transitory computer readable medium of claim 17, wherein determining the egress queue congestion state further causes the one or more processors to perform the steps of:

when the egress queue buffer usage drops below a third threshold, setting the egress queue congestion state to a congestion clear value.

19. The non-transitory computer readable medium of claim 15, wherein the egress queue congestion state is determined using a Stop-Max algorithm or a Stop-Partial algorithm.

20. The non-transitory computer readable medium of claim 15, wherein determining the ingress queue congestion state causes the one or more processors to perform the steps of:

when an ingress queue buffer usage reaches a first threshold, setting the ingress queue congestion state to a congestion value; and when the ingress queue buffer usage drops below a second threshold, setting the ingress queue congestion state to a congestion clear value.

* * * * *